Oct. 24, 1967 K. SIMANAVICIUS 3,349,389

DETECTION SYSTEM FOR BINARY DATA

Filed June 30, 1964 2 Sheets-Sheet 1

INVENTOR.
KESTUTIS SIMANAVICIUS
BY [signature]
ATTORNEY

Oct. 24, 1967 K. SIMANAVICIUS 3,349,389

DETECTION SYSTEM FOR BINARY DATA

Filed June 30, 1964 2 Sheets-Sheet 2

United States Patent Office 3,349,389
Patented Oct. 24, 1967

3,349,389

DETECTION SYSTEM FOR BINARY DATA

Kestutis Simanavicius, Poughkeepsie, N.Y., assignor to International Business Machines Corporation, New York, N.Y., a corporation of New York Filed June 30, 1964, Ser. No. 379,274
11 Claims. (Cl. 340—347)

ABSTRACT OF THE DISCLOSURE

A detection system for detecting binary data in phase encoded signals, wherein the phase encoded signals are combined in a phase detector with reference signals, to produce an output indicative of the phase relationship therebetween, including a variable frequency clock which is arranged to sample the total phase encoded signal output during an initial synchronization period, so as to quickly synchronize the clock, and also including means terminating the initial synchronization period and afterward allowing the clock to sample only those portions of the phase encoded signals as fall within certain limits so as to reject spurious signals but to allow for continuous fine adjustments even in the post-initial synchronization period.

*Background and prior art*

Figures 1, 3, 4:
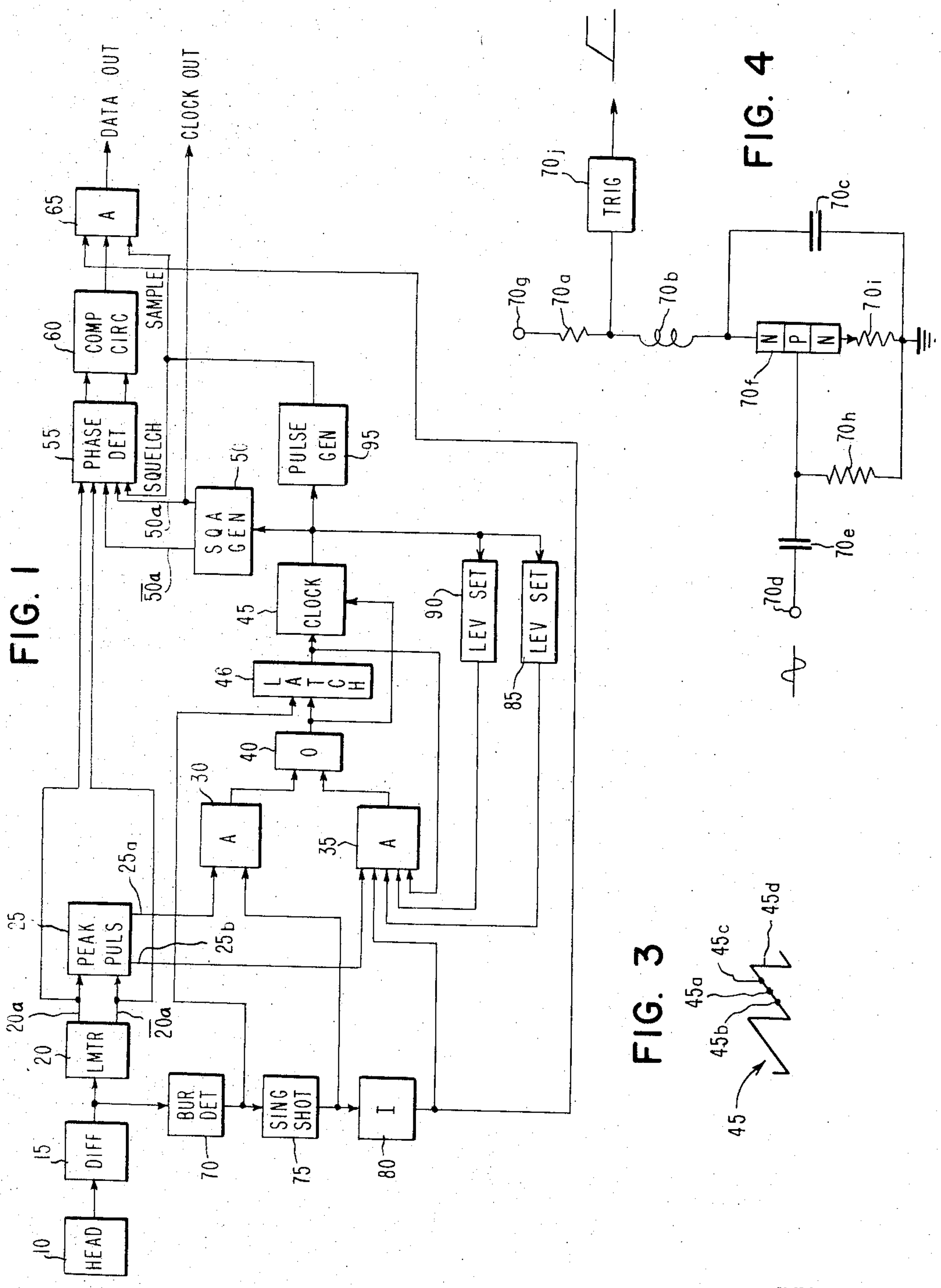

Binary 1's and 0's can be represented by any means which will provide two distinguishable states. Correspondingly, any such representation can find a means of storage of the data encoded thereby. A common, but not exclusive, means of storage is by magnetically recording electrical signals representing the two distinguishable states. An early form of magnetic recording of electrical signals as binary data involved discrete pulses at timed intervals, the binary information being represented by the presence or absence of a pulse, or pulses of opposite polarity. A later development in the art was magnetic recording wherein the record never returned to zero magnetization. One such non-return-to-zero technique would continuously magnetize the record in one direction, and change level to indicate a binary change. Another would change polarity without return-to-zero.

In the present development of the art however, very high data processing speeds and resultant high densities of magnetically recorded information render the already mentioned techniques less desirable because of timing tolerances and increasing unreliability due to noise. Another technique is becoming popular because it eliminates these difficulties. This technique, known as "phase modulation," is shown in U.S. Patent 2,734,186 entitled "Magnetic Storage Systems" by F. C. Williams and issued Feb. 7, 1956. Phase modulation is a form of non-return-to-zero representation of binary information, but control of the flux or electrical signal change is different.

In a magnetic storage system using phase modulation techniques, each binary bit cell experiences a change in polarity at the center of the bit cell. The direction of the polarity change represents the binary information. For example, a binary "1" would be represented by a change from the positive magnetization to a negative magnetization at the center of a bit cell, and a binary "0" would be represented by a change in magnetization from a negative magnetization to a positive magnetization. In other words, if an electrical signal were produced having a direct correspondence to the flux pattern on the magnetic medium, and this signal were compared to a reference signal, the electrical signal representing the binary information would be in phase or out of phase with the reference depending on the binary information represented.

A desirable feature of phase modulation is that self clocking of the binary information can be achieved. Since each binary bit cell has a change in state at the center, the change will be detected at the same frequency as the binary information originally recorded. An electrical pulse generated as a result of the flux change at the center of each bit cell can be utilized to produce an electrical wave whose frequency and phase can be initiated by the binary data. The reference phase thus generated can subsequently be utilized to determine the phase of the electrical signal derived from magnetic information.

Some prior art techniques have been devised for reproducing and detecting binary information using phase modulation. These systems have taken advantage of the self clocking feature to provide a reference pulse which is applied to electrical signals derived from the magnetic information to sample the polarity of the electrical signal at precise intervals. While these systems provide means for detecting magnetically stored information at higher densities than prior art non-phase modulated systems, they still experience difficulties at very high densities. Mechanical tolerances at very high densities are critical so that slight variations in speed of the record medium can cause rapid time displacement of the reproduced electrical signal such that polarity sensing may produce an erroneous indication. Further, in high density recording, the spacing between the reproducing transducer and the record medium becomes critical. Irregularities in the record medium or in the record guiding system may cause excessive separation such that an electrical signal representing a flux change may not be detected. This again would result in an error condition for prior art systems.

*Objects of the invention*

It is accordingly an object of the present invention to provide an improved binary data detection system capable of higher frequency operation and greater reliability.

A further object of the present invention resides in the provision of an improved binary data detection system utilizing a phase modulation technique to represent binary data.

A still further object of the present invention resides in the provision of an improved binary data detection system utilizing a phase modulation technique to represent binary data wherein large phase variations between a data-derived signal and a clock signal are accepted in an initial synchronization period so as to achieve synchronization rapidly.

Another object of the present invention resides in the provision of such a system wherein resynchronization is provided continuously during data-record read-out in accordance with any slight variation between a data-derived signal and a clock signal that may occur while spurious data-derived signals are prevented from affecting synchronization.

*Brief description of the invention*

These and other objects, features, and advantages of the present invention are obtained in a preferred embodiment thereof providing a phase modulated alternating electrical signal representing binary information. The alternating electrical signal is applied to means for producing an alternating reference signal having the same frequency as, and synchronized with, the data-derived electrical signal. The reference signal has a constant phase. Means are provided whereby an initial burst of binary characters, all of the same type, initiates this reference signal and brings it into initial synchronization, after which a resynchronization means is brought into play. The resynchronization means operates continuously all during data-record read-out, and is adapted to allow resynchronization of the reference signal by data-derived pulses provided the pulses are not excessively out of synchronization, in which case they are rejected as spurious. Means are provided for combining the data-derived signal and the reference signal to obtain an output signal indicating the phase relationship between the two. The phase indicating signal is then utilized at an output to provide a binary data representing signal having more familiar characteristics. Further means are provided to periodically reset the combining means to a reference level, and to sample the output signal.

The foregoing and other objects, features, and advantages of the invention will be apparent from the following more particular description of a preferred embodiment of the invention, as illustrated in the accompanying drawings.

Figure 2:
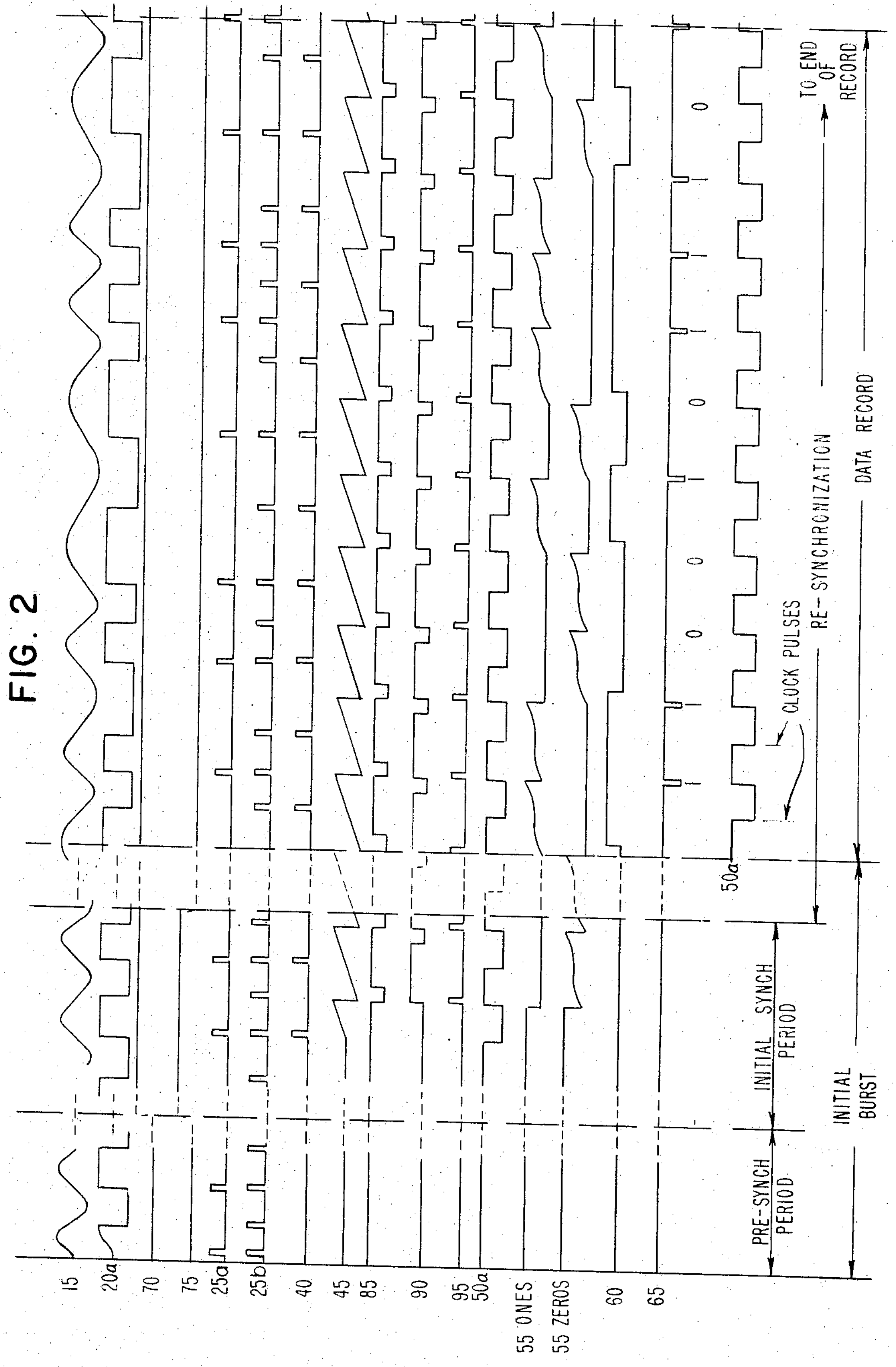

In the drawings:

FIGURE 1 is a block diagram of all of the operative elements of the present invention, FIGURE 2 shows various wave forms generated during the operation of the elements of FIGURE 1, FIGURE 3 shows a detail portion of one of the wave forms of FIGURE 2, and FIGURE 4 is a diagram partially in circuit form and partially in block form showing one of the elements of FIGURE 1.

*General description*

The general purpose of this invention is to detect binary information represented by an electrical signal which has been phase modulated in accordance with the binary information. The detection system must be capable of determining that the electrical signal has one phase or a complementary phase, 180 degrees out of phase with said one phase. In other words, the detection system must be capable of indicating, within a particular binary information cell, whether the signal changes from a negative to a positive polarity or whether the electrical signal changes from a positive to a negative polarity.

More specifically the purpose of this invention is to provide means for producing a reference signal which has a constant phase and is synchronized with, and has the same frequency as, a phase modulated electrical signal derived from the binary information of the record. Means are provided so that the reference signal is adjusted during an initial synchronization period by accepting all of the phase modulated electrical signal derived from the binary information of the record. Synchronization is thus more quickly achieved. Further means are provided whereby during a subsequent period only the portions of the phase modulated electrical signal that fall within certain limits of phase shift are accepted for synchronization. Resynchronization is thus effectuated in the said subsequent period (where necessary) but only relatively fine resynchronization adjustments are allowed. The combination of effects is to eliminate phase checks, to attain rapid initial synchronization, and to attain continuous fine adjustment on synchronization while rejecting spurious excessively phase shifted signals. Other effects and advantages appear hereinafter.

In FIGURE 1, elements 10, 15, and 20 are effective to ultimately produce an electrical signal which is phase modulated in accordance with binary data. Elements 25, 30, 35, 40, 45, and 50 are effective to produce the reference signal. The reference signal has a constant phase and is synchronized with, and has the same frequency as, the phase modulated electrical signal. Element 55 is utilized to combine the phase modulated electrical signal and the reference signal to produce an output indicative of the phase relationship between the phase modulated electrical signal and the reference signal. Elements 60 and 65 are a combination of output means for producing output signals indicative of the binary information, in reference to element 50. Elements 70, 75, and 80 are effective to determine an initial clock synchronization period, and to control elements 30, 35, and 65 so as to allow the aforesaid full synchronization between the phase modulated electrical signal and the reference signal during the initial clock synchronization period, while not allowing any data out of element 65 during that period. Upon termination of the initial clock synchronization period, elements 30 and 35 are responsive to element 75, and elements 85 and 90 are responsive to element 45, effective to thereafter allow resynchronization between the phase modulated electrical signal and the reference signal only within relatively fine adjustment limits, that is to say, wide phase shift variations are thereafter rejected as spurious. Element 95 is responsive to the element 45 signal and is effective to reset element 55 at the end of each bit cell of information, and to sample element 65 so as to read any information from element 60.

In the detailed discussion to follow, reference should be made to FIGURE 2 which shows wave forms associated with elements of FIGURE 1. The wave forms have been numbered to correspond with the element in FIGURE 1 producing the wave form. The wave forms include a portion of the burst area and a portion of the data area.

*Electrical data signal*

When a magnetized record medium is movced past a reproducing head 10, an eelctrical signal is produced which is a differentiation of the flux pattern on the record medium. The head 10 output is applied to a differentiator 15 which produces an output signal having zero crossings corresponding to the peaks of the signal from head 10. The differentiator 15 output is clipped in limiter 20 to produce an alternating electrical signal which corresponds to the magnetization of the record medium and is phase modulated in accordance with the binary information. The data-derived signal outputs of limiter 20 are a "true" data-derived signal and its "complementary" signal, indicated in FIGURE 1 as 20*a* and $\overline{\mathbf{20}a}$. For convenience, only the "true" signal is shown in FIGURE 2 wherever throughout this disclosure both a "true" and a "complementary" signal are indicated in FIGURE 1. In all cases of course, the "complementary" signal is merely an exact inversion of the "true" signal, that is, it is 180 degrees out of phase therewith.

While the alternating electrical signal 20*a* of FIGURE 2 is shown to have been developed from magnetically recorded information, it is apparent that the same signal could be developed from other record means, utilizing other transducers. In general then, it will be understood that signal 20*a* may be developed from a transmission ssytem which provides a phase modulated electrical signal in response to binary data, regardless of the source of the phase encoded information. The binary information conveyed by the phase modulated electrical signal 20*a* is shown above the wave form. Wave form of FIGURE 2 shows that the electrical signal changes polarity at least once during each binary bit cell. For example, a binary "0" is represented by a polarity change from negative to positive, and a binary "1" is represented by a polarity change from positive to negative.

As has already been mentioned, the wave forms of FIGURE 2 show both a burst area and a data area. It is contemplated that in the use of the present invention, the encoded binary information will be preceded by a plurality of a single kind of binary bit cell, termed a burst. For example, before the actual data record, it is contemplated that a burst of binary ZEROS is to be received, for purposes of synchronization between the phase modulated electrical signal and the reference signal. A burst of ONES could also be used. This burst area thus forms the interface between successive data records, and the time just before the burst may be occupied by silent time. The burst thus announces that the data record is about to start, and also is employed by the detection means of the invention to initially synchronize the phase modulated data-derived signal and the reference signal. The first binary bit cell of the actual data record will be opposite in state to those of the burst, in order to announce that the burst has terminated and the data has started. In other words, if the burst is all binary ZEROS, the first bit cell of the data record following will be a binary ONE, and vice versa.

*Alternating reference signal*

As is shown in FIGURE 1, the output of peak pulser 25, consisting of wave forms 25*a* and 25*b*, is applied respectively to AND gates 30 and 35. Peak pulser 25 is any suitbale means which will generate an output 25*b* of pulses, wherein an output pulse occurs for every zero crossing of the wave form 20*a*, and will also generate an output 25*a* of pulses, wherein an output pulse occurs for every negative to positive zero crossing of the wave form 20*a*, all as shown in FIGURE 2. Output 25*a* thus represents the middle polarity change of the burst area bits and output 25*b* represents all the polarity changes.

AND gates 30 and 35 are controlled, as hereinbelow explained, so that one or the other is always open exclusively after the burst detector 70 has been activated by binary data. Thus either wave form 25*a* or 25*b* appears at all times thereafter at OR gate 40. The initial wave form, transmitted through AND gate 30, appears at OR gate 40, which may be of standard construction, and is admitted to the latch 46 of variable frequency clock 45. The variable frequency clock 45 is a free-running sawtooth generator described in deail in the assignee's copending application, Ser. No. 117,176, filed June 14, 1961, enittled, "Variable Frequency Sawtooth Generator." The variable frequency clock 45 produces a sawtooth output shown in FIGURE 2. The upper and lower voltage limits of the sawtooth wave form are held constant such that no matter what the charging rate of the capacitor is, the sawtooth wave form will pass through a fixed potential midway between the upper and lower limits. The clock signal output of clock 45 is periodic in nature, that is, it consists of a series of essentially repeated waves, and the spacing between the individual waves is the period.

To control the frequency of the variable frequency clock 45 in accordance with the frequency of the alternating electrical signal representing the binary data, the peak pulse signals 25*a* or 25*b* from peak pulser 25 are applied to the variable frequency clock 45, after the latch 46 has opened, to determine where the peak pulses 25*a* or 25*b* occur in relation to the zero crossing of the sawtooth wave form 45 in FIGURE 2. As disclosed in the aforesaid patent, this relationship is utilized to change the charging rate of the capacitor to thereby change the frequency of the variable frequency clock 45. In other words, the variable frequency clock 45 has such internal characteristics that it is self synchronizing with the signals 25*a* or 25*b* applied thereto.

The latch 46 cannot be opened until it is conditioned by burst detector 70, as explained hereinafter. Such latches are well known, and may be essentially a switch that must be primed before it can be switched. Assuming the latch has been conditioned, the next pulse arriving at latch 46 from OR gate 40 will start the variable frequency clock 45. Means are provided to assure that this next pulse must be a 25*a* pulse, not a 25*b* pulse. As is shown by the first sawtooth in wave form 45 of FIGURE 2, rise from the D.C. level commences at the occurrence of this first pulse of wave form 25*a*, also shown in FIGURE 2. Thus the sawtooth wave form 45 is synchronized at its inception with pulse wave form 25*a*. Specifically, the center of the ramp of sawtooth wave form 45 is synchronized with the initially admitted pulse 25*a*, and the aforesaid internal characteristics of variable frequency clock 45 keeps it synchronized with the centers of subsequent pulses 25*a* during the initial burst period, despite variations in the frequency of pulses 25*a* while lock-in is being attained.

After the initial synchronization period described hereinafter, the AND gate 30 is closed and the AND gate 35 is opened (but for restricted portions of each sawtooth wave form 45), so that subsequently certain wave form 25*b* pulses are admitted to variable frequency clock 45 instead of pulses 25*a*. This will be described with its ramifications hereinafter, the essential point for understanding now being that during the initial synchronization period and the subsequent period, the variable frequency clock 45 is controlled by the pulses 25*a* and 25*b* respectively, admitted via AND gates 30 and 35.

The output of variable frequency clock 45 is in any case applied to square wave generator 50 which produces complementary square waves 50*a* and $\overline{50a}$ which are applied to phase sensitive detector 55, and which constitutes the aforesaid reference. The square wave signal outputs 50*a* and $\overline{50a}$ are at the same frequency as the sawtooth frequency 45, they are synchronized therewith, and they each have a constant phase. Thus the reference signals 50*a* and $\overline{50a}$ each have a constant phase but can be changed in frequency in accordance with the output of the variable frequency clock 45 which is controlled in the first instance by the frequency of the electrical signal representing the binary data. The wave forms 50*a* and $\overline{50a}$ are periodic, that is, they are repetitive in cycles.

*Initial synchronization means*

As shown in FIGURE 1, the output of differentiator 15 is also applied to burst detector 70. Essentially burst detector 70 is an integrating amplitude sensitive means, which responds to a predetermined number of consecutive signals representing a certain number of cell bits, by producing an output or an output level indicative thereof. For example, when ZEROS constitute the said burst, the burst detector 70 will be arranged to distinguish between noise and signal so that a certain probability of a burst being on the line is satisfied by a certain number of ZERO bit signals of a certain minimum amplitude in a certain period.

One example means for implementing burst detector 70 is shown in FIGURE 4. Resistance element 70*a*, inductance element 70*b*, and capacitance element 70*c* are arranged in an integrating circuit. The transistor 70*f* is connected in common emitter configuration, and the signal from differentiator 15 is applied at 70*d*, through coupling capacitor 70*e*, to the base of transistor 70*f*. The load circuit includes a Schmitt trigger 70*j*, shown in block form, deriving its input signal from the R-L circuit 70*a*, 70*b*. The collector is positively biased at 70*g*. A base bias resistor 70*h* and an emitter resistor 70*i* are employed.

The arrangement is such that the transistor is in a nonconductive state under no input signal conditions. When the input wave form 15 is applied at 70*d*, the collector output is a half rectified wave proportional to the zero to peak of the input signal, the value of the emitter resistor 70*i*, and the base to emitter voltage drop. The current source thus developed at the collector of transistor 70*f* drives the integrating circuit 70*a*, 70*b*, 70*c*. Successive half waves will thus develop a negative going voltage drop across load resistor 70*a*.

The Schmitt trigger 70*j* is sensitive to the voltage drop across resistor 70*a*. This device is well known, and is capable of producing one level output on one side of a certain level input, and another level output on the other side of that certain level input. Thus at first, the trigger 70*j* will produce a low level output. When in a certain period a certain number of half waves of certain amplitude are received by the integrating network 70*a*, 70*b*, 70*c*, the voltage across resistor 70*a* will change to that certain value necessary to activate trigger 70*j* to its high level output, where it will stay until the input signal of 70*j* changes back from that certain value, and the low level output of 70*j* will again be attained. The two level signal produced by Schmitt trigger 70*j* is the actual wave form 70 of burst detector 70.

It will be thus apparent that the elements of burst detector 70 may be chosen to produce the high level of wave form 70 at receipt of a certain number of certain amplitude bits in a certain period. The probability of true detection can be varied by varying the circuit values. When the burst and information areas are over, the integrating network 70*a*, 70*b*, 70*c*, will not maintain its voltage, and will eventually fall back past that certain value which previously kept Schmitt trigger 70*j* at the high level of output. Thus the end of the information period eventually ends the high level of wave form 70.

When a burst has been detected as aforesaid, the output of burst detector 70, shown in FIGURE 2 as wave form 70, is applied both to single shot 75 and latch 46. Single shot 75 is essentially a square wave generator adapted to produce a single extended wave upon stimulation by burst detector 70. The wave form 75 is shown in FIGURE 2, and the length thereof controls the length of the initial synchronization period, as explained hereinafter. The latch 46 is, as aforesaid, adapted to be conditioned by the signal from burst detector 70, so that the next pulse entering from OR gate 40 opens the latch.

The output of single shot 75 is applied as wave form 75 to normally closed AND gate 30, which it immediately opens. The output of single shot 75 is also applied to inverter 80, which is of standard design, and which inverts the wave form 75. The output of inverter 80, which to emphasize its relation to wave form 75 is labelled $\overline{75}$, is applied to AND gate 35, which it immediately closes. The same output $\overline{75}$ of inverter 80 is applied to AND gate 65 which it also immediately closes.

It is thus apparent, that when the burst is detected by burst detector 70, the latch 46 is conditioned, and the single shot 75 opens gate 30 and by means of inverter 80 closes the gates 35 and 65. The effect is to admit pulses 25*a* to now-conditioned latch 46 which opens to start wave form 45 from variable frequency clock 45 so that the mid-point of the first rise of sawtooth 45 is synchronized with the first pulse 25*a*. Additionally and simultaneously read-out is prevented during initial synchronization, by the closing of AND gate 65.

AND gate 30 is opened and AND gate 35 is closed by single shot 75 and inverter 80 substantially simultaneous with the conditioning of latch 46 by burst detector 70, because the elements 70, 75, and 80 are essentially simultaneously activated by an initial burst from differentiator 15. However, at very high data frequencies a 25*b* pulse might get through latch 46 after it is conditioned, because burst detector 70 might condition the latch 46 before inverter 80 acts to close AND gate 35. While other means such as delay circuits could be employed, it is preferred to cause the same signal from lacth 46 that starts clock 45 to be applied to AND gate 35 so as to open it. Thus, the very act of conditioning the output of latch 46 causes the opening of AND gate 35, so that the only pulse that can open latch 46 and start clock 45 must be a 25*a* pulse.

As aforesaid, all during the duration of single shot wave form 75, the variable frequency clock 45 is locking into the binary data frequency. Clearly the length of wave form 75 may be adapted to whatever needs occur. During this initial synchronization period the variable frequency clock accepts any pulses 25*a*, no matter how badly phase shifted, within design limits. By accepting all pulses, synchronization is speeded-up.

The end of the initial synchronization period coincides with the end of wave form 75, as aforesaid. AND gate 30 is normally closed, therefore the end of wave form 75 allows gate 30 to return to its normal closed condition. Through inverter 80, the end of wave form 75 also removes the signal $\overline{75}$ from AND gate 35 and AND gate 65. However these latter two AND gates do not necessarily open, since each requires other signals to open, as explained hereinafter.

*Resynchronization means*

The output of variable frequency clock 45 is exactly synchronized to the data-derived signal 25*a* in the initial synchronization period controlled by single shot 75 as aforesaid. The initial synchronization period may be long enough to allow the clock to synchronize and yet short enough to finish before the first bit of the data record. In any event, when the initial synchronization period has ended the output wave form 45, and consequently the reference signals 50*a* and $\overline{50a}$, will be fully synchronized to the data-derived signal 20*a*. However, in further operation, secular changes in the synchronization can occur. In order to provide for resynchronization after the initial synchronization period (i.e., continuing synchronization whenever needed) to account for these changes, but to exclude spurious data-derived signals that might cause greater unsynchronization, means are provided whereby resynchronization is attainable after the end of the initial synchronization period and all during the data read-out period, and yet excessively phase shifted data-derived signals are rejected as spurious and thus excluded from affecting synchronization in any way. Of course, sometimes during the data record (i.e., after the initial burst) there is continuing perfect synchronization, and the pulses 25*b* coincide with the center of the sawtooth ramp 45*a* (FIGURE 3). But whenever unsynchronization does occur, the resynchronization means acts to correct it.

It has already been mentioned that at the end of the initial synchronization period the AND gate 30 is closed. It was also stated that although signal $\overline{75}$ from inverter 80 was removed from AND gate 35, which it had previously held closed, other signals were needed to open AND gate 35. These signals are supplied by level setters 85 and 90. These level setters, which may be of conventional design, are connected to the output of variable frequency clock 45 as shown in FIGURE 1, and respond to the sawtooth wave form 45 shown in FIGURE 2 by producing wave forms 85 and 90. This is, of course, conventional level setter action, and the effect is to bracket a portion of the ramp of each sawtooth of wave form 45. The outputs 85 and 90 are applied to AND gate 35, which is adapted to open during the period mutually determined thereby. That is to say, AND gate 35 opens during a restricted portion of the rise time of each sawtooth, in response to the action of level setters 85 and 90. In practice the level setters are adjusted so that the mid-point of the ramp is evenly bracketed, so that the AND gate 35 is open an equal period before and after each ramp mid-point. This is shown in FIGURE 3 wherein the ramp midpoint is labelled 45*a*, the lower and upper limits of the open condition of AND gate 35 are indicated at 45*b* and 45*c*, and the fly-back is indicated at 45*d*.

When the initial synchronization period ends, gate 30 is closed, and thus pulses 25*a* cease to synchronize variable frequency clock 45. At the very next sawtooth of wave form 45 from clock 45, level setters 90 and 85 combine to open AND gate 35 to admit any 25*b* wave form pulses appearing within the time period set by the level setters, that is, within the time period represented between voltage levels 45*b* and 45*c* on the ramp of the sawtooth of FIGURE 3. As aforesaid, pulses 25*b* occur at both polarity changes in wave form 20*a*. After initial synchronization has ended, therefore, the sawtooth wave form 45 may be resynchronized to any pulse 25*b*, that is, to one polarity-change-corresponding pulse or the other polarity-change-corresponding pulse, so long as the pulse arrives within the limits defined by level setters 85 and 90 as aforesaid. Thus, whatever pulse 25*b* reaches clock 45, it cannot be out of synchronization with the center 45*a* of the sawtooth ramp, as shown in FIGURE 3, more than the amount of 45*b* or 45*c*. When accepted, such a moderately out of synchronization pulse 25*b* causes resynchronization by internal action of the variable frequency clock 45, as aforesaid.

*Combining means—Phase detector*

The complementary phase modulated signals 20*a* and $\overline{20a}$ representing the binary data and the complementary reference signals 50*a* and $\overline{50a}$ from square wave generator 50 are combined in a phase sensitive detector 55. Generally, the phase sensitive detector 55 will indicate the phase relationship between the phase modulated wave form 20*a* of FIGURE 2 and the alternating reference signal 50*a*. Each of the signals 20*a* and 50*a* have positive and negative polarities. In other words, when the phase modulated electrical signal 20 and the reference signal 50*a* are in phase, the first half of the cycle will find both true signals (20*a* and 50*a*) at a positive polarity and for the second half of a cycle the complement signals ($\overline{20a}$ and $\overline{50a}$) will have a positive polarity. If the phase modulated electrical signal and the reference signal are out of phase, signal $\overline{20a}$ will be at a positive polarity and signal 50*a* will be at a positive polarity for one half cycle, and for the second half cycle the signal 20*a* will be at a positive polarity and the signal $\overline{50a}$ will be at a positive polarity.

One example of circuitry for implementing the functions of phase sensitive detector 55 is shown in the assignee's copending application, Ser. No. 249,529 filed Jan. 4, 1963, entitled "Binary Data Detection System." The respective outputs 55 ONES and 55 ZEROS are shown in FIGURE 2. As will be explained hereinbelow, at the end of each binary bit cell, pulse generator 95 is effective to reset phase sensitive detector 55 as indicated by the squelch in FIGURE 1.

*Compare circuit—Output means*

In FIGURE 1, the 55 ONES and 55 ZEROS outputs of phase sensitive detector 55 are applied to a voltage comparator 60 which is effective to determine which of the outputs of phase detector 55 is at a greater potential. As shown in FIGURE 2, at wave form 60, the voltage comparator 60 can provide a two-level output representing the binary information. The voltage comparator 60 is a bistable device which maintains one stable state during the presence of binary ONES and switches to the opposite stable state when binary ZEROS are detected. The voltage comparator 60 is endowed with a short memory span and may comprise cross-coupled Schmitt triggers capable, for example, of switching from the stable state representing binary ONE when the output of phase sensitive detector 55 shows a greater potential on the 55 ZEROS output than on the 55 ONES output. In the same manner the stable state of voltage comparator 60 representing a binary ZERO will switch to the stable state representing a binary ONE when the 55 ONES output of phase sensitive detector 55 shows a greater potential than the 55 ZEROS output.

One advantageous example of circuitry for implementing the functions of voltage comparator 60 is shown in the assignee's copending application Ser. No. 249,529 filed Jan. 4, 1963, entitled "Binary Data Detection System."

The output wave form 60 of compare circuit 60 is applied to AND gate 65. The binary representative signal 65 is shown in FIGURE 2. When read with the reference signal 50, the signal indicates binary ONES and ZEROS. Thus, a ONE is indicated by a wave form 65 pulse. A ZERO is indicated by lack of a wave form 65 pulse occurring between two consecutive negative transitions of wave form 50*a*. In order for the binary representative wave form 60 to cause read-out of AND gate 65, the initial synchronization period must be over, that is, the signal from inverter 80 must be removed from AND gate 65, and also, a sample pulse from pulse generator 95 must appear at AND gate 65, as explained hereinbelow. It is thus apparent that read-out is prevented during initial synchronization, so that an excessively phase shifted ZERO (for example) cannot be read as a ONE to thus falsely indicate at the 65 output that the data record itself was starting. These and other features and advantages of the invention will be separately described below.

*Pulse generator*

As previously mentioned, pulse generator 95 of FIGURE 1 is responsive to the output of the variable frequency clock 45 to produce an output pulse somewhere during each sawtooth, for example, at the point of each sawtooth corresponding to the end of one bit cell and the start of the next bit cell, as shown by comparing wave forms 20*a* and 95. This pulse is effective at phase sensitive detector 55 to reset (squelch) the phase sensitive detector for the next binary bit cell, as already mentioned. The pulse of wave form 95 is also effective at AND gate 65 to sample the wave form 60 appearing thereat at that precise instant, also as already mentioned. The sample of course, results in a pulse of output wave form 65 when a rise coexists in wave form 60. As already explained, when no rise coexists at wave form 60, no pulse 65 results from AND gate 65, and this is distinguished from silent time by the reference signal taken off square wave generator 50. Thus the output logic is that a pulse 65 indicates a ONE, and no pulse 65 (as measured against wave form 50*a*, as explained above) indicates a ZERO.

In general, with regard to the wave forms shown in FIGURE 2, it should be noted that the number of binary bits of data shown for each portion of the record is reduced greatly in number. Moreover, the breaks in the wave forms are intended to indicate that more data may be included in actuality than is shown for that particular portion such as "pre-synch" period, "initial-synch" period, etc.

*Features of the invention*

By providing means 70, 75, 80, 85 and 90 for dividing synchronization into a first period wherein all the signal 25*a* is admitted to clock 45, and a second period wherein only the portion of signal 25*b* falling within limits defined by means 85, 90 is admitted to clock 45, certain advantages accrue.

First, the clock is quickly synchronized in the initial burst area during the initial or first synchronization period because all degrees of phase shift between the signal 25*a* and the signal 45 are admitted. At the same time reading of one of the series of one kind of characters (e.g., series of ZEROS) as the other kind (e.g., a ONE) because of excessive phase shift is prevented by the closing of gate 65. A false indication that the data record is about to start is thus prevented.

Second, the clock is continuously synchronized in the second synchronization period (also termed the resynchronization period herein), but because the data record is being read during most or all of this period, the action of level setters 85, 90 prevents spurious pulses 25*b* from affecting synchronization of clock 45. Since clock 45 is synchronized when the said second synchronization period begins, the effect is to allow secular readjustment of synchronization whenever it occurs, but without paying the price of allowing spurious, excessively out of phase data-derived signals from disturbing synchronization. Moreover, such spurious pulses might occur on a portion of the ramp of sawtooth 45 such as fly-back 45*d* and this could not be tolerated during data read-out.

Third, means 70, 75, 80, 30, 35, 40, 46 and 45 are arranged so that the sawtooth wave form 45 starts with a pulse of wave form 25*a* (as shown in FIGURE 2, wave form 45) such that there is initial synchronization between the data-derived signal 25*a* and the clock signal 45 (and thus the reference signals 50*a*, $\overline{50a}$). Subsequent pulses 25*a* may be phase shifted therefrom, but the clock 45 will adjust thereto, and the fact that the reference signals 50*a* and $\overline{50a}$ are completely correlated with the signal 45 eliminates the need for a phase check. This is so because any data-record written on the tape (for example) start from the same saturated state (for example, a negative saturation), and the square wave reference generator 50 has fixed phase relation to the wave form 45.

Finally, in general the present system has all the advantages of phase encoded detection systems (such as relative freedom from mechanical tolerances in the record and record mechanisms and the like, as discussed already) without the disadvantages. The system is capable of operation at very high data densities, yet very fast initial synchronization is provided together with continuous synchronization (where needed) all during the data record without acceptance of noise into the resynchronization process. This combination of advantages is unique. In addition certain other more generalized advantages occur with use of the invention, because of the general mode of phase comparison it practices, and these advantages are fully recited in the assignee's copending application Ser. No. 249,529, filed Jan. 4, 1963, entitled "Binary Data Detection System."

While the invention has been particularly shown and described with reference to a preferred embodiment thereof, it will be understood by those skilled in the art that various changes in form and details may be made therein without departing from the spirit and scope of the invention.

What is claimed is:

1. A binary data detection system comprising a source of complementary alternating electrical signals representing binary information; reference signal means responsive to said complementary alternating electrical signals, for producing complementary alternating reference signals having the same frequency as, and synchronized with, the portion of the said electrical signal effective thereon; output means, including means for combining said complementary electrical signals and said complementary reference signals, for providing an output signal representing the binary information; and control means responsive to said electrical signal for determining first and second synchronization periods, including means for restricting the portion of said electrical signal effective on said reference signal means during said second synchronization period to limited degrees of instantaneous phase shift of said electrical signal.

2. A binary data detection system comprising a source of complementary alternating electrical signals representing binary information; reference signal means responsive to said complementary alternating electrical signals, including synchronization means, for producing complementary alternating reference signals having the same frequency as, and synchronized with, the portion of said electrical signal effective thereon; output means, including means for combining said complementary electrical signals and said complementary reference signals, for providing an output signal representing the binary information; and control means responsive to said electrical signal for determining first and second synchronization periods, including means monitoring the output of said synchronization means for restricting the input of said electrical signal to said synchronization means during said second synchronization period to those input portions having less than certain predetermined and limited instantaneous phase shifts.

3. A binary data detection system for use with a source of alternating electrical signals representing binary information wherein the information portion is preceded by an initial burst of binary characters comprising means for deriving complementary alternating electrical signals representing bianry data from said source; reference signal means responsive to said complementary alternating reference signals having the same frequency as, and synchronized with, the portion of said complementary electrical signals effective thereon, including means for admitting said electrical signals for synchronization of said reference signals during only a portion of each cycle of said alternating reference signals; an initial burst detector conneted to said source and responsive to said initial burst of binary characters, including timing means for determining first and second synchronization periods, said initial burst detector being adapted to control said reference signal means during said first synchronization period so that all said electrical signals are effective to synchronize said reference signals, and to control said reference signal means during said second synchronization period so that said electrical signals are effective to synchronize said reference signals only during the said portion of each cycle thereof; and output means, including means for combining said complementary electrical signals and said complementary reference signals, for providing an output signal representing the binary information.

4. A binary data detection system for use with a source of alternating electrical signals representing binary information wherein the information portion is preceded by an inital burst of binary characters comprising means for deriving complementary alternating electrical signals representing binary data from said source; reference signal means responsive to said complementary alternating electrical signals, for producing complementary alternating reference signals having the same frequency as, and synchronized with, the portion of said complementary electrical signals effective thereon, including means for admitting said electrical signals for synchronization of said reference signals during only a portion of each cycle of said alternating reference signals; an initial burst detector connected to said source and responsive to said initial burst of binary characters by starting said reference signals, including timing means for determining first and second synchronization periods, said initial burst detector being adapted to control said reference signal means during said first synchronization period so that all said electrical signals are effective to synchronize said reference signals, and to control said reference signal means during said second synchronization period so that said electrical signals are effective to synchronize said reference signals only during the said portion of each cycle thereof; and output means, including means for combining said complementary electrical signals and said complementary reference signals, for providing an output signal representing the binary information.

5. A binary data detection system for use with a source of alternating electrical signals representing binary information wherein the information portion is preceded by an initial burst of binary characters comprising means for deriving complementary alternating electrical signals representing binary data from said source; reference signal means responsive to said complementary alternating electrical signals, for producing complementary alternating reference signals having the same frequency as, and synchronized with, the portion of said complementary electrical signals effective thereon, including gating means for admitting said electrical signals for synchronization of said reference signals, and limiting means responsive to said reference signals for opening said gating means during only a limited portion of each cycle of said alternating reference signals; an initial burst detector connected to said source and responsive to said initial burst of binary characters by starting said reference signals in synchronization with said data-derived signal, including timing means for determining first and second synchronization periods, said initial burst detector being adapted to control said gating means during said first synchronization period so that all said electrical signals are effective on said reference signal means, and to control said gating means during said second synchronization period so that said limiting means controls the portions of said electrical signals effective on said reference signal means; and output means, including means for combining said complementary electrical signals and said complementary reference signals, for providing an output signal representing the binary information.

6. A binary data detection system for use with a source of alternating electrical signals representing binary information wherein the information portion is preceded by an initial burst of binary characters comprising means for deriving complementary alternating electrical signals representing binary data from said source; reference signal means responsive to said complementary alternating electrical signals, for producing complementary alternating reference signals having the same frequency as, and synchronized with, the portion of said complementary electrical signals effective thereon, including synchronizing means having a periodic output and adapted for synchronizing said electrical signals and said reference signals, gating means connecting said electrical signals to the input of said synchronizing means, and limiting means responsive to the output of said synchronizing means for opening said gating means during only a limited portion of each period of said periodic output from said synchronizing means; an initial burst detector connected to said source and responsive to said initial burst of binary characters by starting said reference signals in synchronization with said data-derived signal, including timing means for determining first and second synchronization periods, said initial burst detector being adapted to control said gating means during said first synchronization period so that all said electrical signals are applied to said synchronizing means, and to control said gating means during said second synchronization period so that said limiting means controls the portions of said electrical signals applied to said synchronizing means; and output means, including means for combining said complementary electrical signals and said complementary reference signals, for providing an output signal representing the binary information.

7. A binary data detection system for use with a source of alternating electrical signals representing binary information wherein the information portion is preceded by an initial burst of binary characters comprising means for deriving complementary alternating electrical signals representing binary data from said source; reference signal means responsive to said complementary alternating electrical signals, for producing complementary alternating reference signals having the same frequency as, and synchronized with, the portion of said complementary electrical signals effective thereon, including variable frequency clock means responsive to said electrical signals and adapted to adjust the clock signal output therefrom to synchronize with the electrical signals applied thereto, gating means connecting said electrical signals to the input of said clock means, and limiting means connected to the output of said clock for opening said gating means during only a limited portion of each cycle of said cyclical output from said clock means; an initial burst detector connected to said source and responsive to said initial burst of binary characters by starting said clock means in synchronization with said data-derived signal, including timing means for determining first and second synchronization periods, said initial burst detector being adapted to control said gating means during said first synchronization period so that all said electrical signals are applied to said clock means, and to control said gating means during said second synchronization period so that said limiting means controls the portions of said electrical signals applied to said clock means; and output means, including means for combining said complementary electrical signals and said complementary reference signals, for providing an output signal representing the binary information.

8. A binary data detection system for use with a source of alternating electrical signals representing binary information wherein the information portion is preceded by an initial burst of binary characters comprising means for deriving complementary alternating electrical signals representing binary data from said source; reference signal means responsive to said complementary alternating electrical signals, for producing complementary alternating reference signals having the same frequency as, and synchronized with, the portion of said complementary electrical signals effective thereon, including variable frequency clock means adapted to adjust the peroidic clock signal output therefrom to synchronize with the input signal thereto, gating means connected to the input of said clock means, means responsive to said complementary electrical signals and adapted to supply a data-derived input signal to said gating means, and limiting means connected to the output of said clock for opening said gating means during only a limited portion of each peroid of said periodic output from said clock means; an initial burst detector connected to said source and responsive to said initial burst of binary characters by starting said clock means in synchronization with said data-derived signal, including timing means for determining first and second synchronization periods, said initial burst detector being adapted to control said gating means during said first synchronization period so that all said data-derived signals are applied to said clock means, and to control said gating means during said second synchronization period so that said limiting means controls the portions of said data-derived signals applied to said clock means; and output means, including means for combining said complementary electrical signals and said complementary reference signals, for providing an output signal representing the binary information.

9. A binary data detection system for use with a source of alternating electrical signals representing binary information wherein the information portion is preceded by an initial burst of binary characters comprising means for deriving complementary alternating electrical signals representing binary data from said source; reference signal means responsive to said complementary alternating electrical signals, for producing complementary alternating reference signals having the same frequency as, and synchronized with, the portion of said complementary electrical signals effective thereon, comprising means for generating said complementary reference signals, variable frequency clock means having the periodic clock signal output therof connected to and controlling said generating means, said clock means being adapted to adjust the clock signal output therefrom to synchronize with the input signal thereto, gating means connected to the input of said clock means, means responsive to said complementary electrical signals and adapted to supply a data-derived input signal to said gating means, and limiting means connected to the output of said clock for opening said gating means during only a limited portion of each period of said periodic output from said clock means; an initial burst detector connected to said source and responsive to said initial burst of binary characters by starting said clock means in synchronization with said data-derived signal, including timing means for determining first and second synchronization periods, said initial burst detector being adapted to control said gating means during said first synchronization period so that all said data-derived signals are applied to said clock means, and to control said gating means during said second synchronization period so that said limiting means controls the portions of said data-derived signals applied to said clock means; and output means, including means for combining said complementary electrical signals and said complementary reference signals, for providing an output signal representing the binary information.

10. A binary data detection system for use with a source of alternating electrical signals representing binary information wherein the information portion is preceded by an initial burst of binary characters comprising means for deriving complementary alternating electrical signals representing binary data from said source; reference signal means responsive to said complementary alternating electrical signals, for producing complementary alternating reference signals having the same frequency as, and synchronized with, the portion of said complementary electrical signals effective thereon, comprising means for generating said complementary reference signals, variable frequency clock means having a periodic clock signal output thereof connected to and controlling said generating means, said clock means being adapted to adjust the clock signal output therefrom to synchronize with the input signal thereto, gating means connected to the input of said clock means, means responsive to said complementary electrical signals and adapted to supply a data-derived input signal to said gating means, and limiting means connected to the output of said clock for opening said gating means during only a limited portion of each period of said periodic output from said clock means; an initial burst detector connected to said source and responsive to said initial burst of binary characters by starting said clock means in synchronization with said data-derived signal, comprising means for detecting said initial burst, and timing means responsive to detection of said initial burst for determining first and second synchronization periods, said initial burst detector being adapted to control said gating means during said first synchronization period so that all said data-derived signals are applied to said clock means, and to control said gating means during said second synchronization period so that said limiting means controls the portions of said data-derived signals applied to said clock means; and output means, including means for combining said complementary electrical signals and said complementary reference signals, for providing an output signal representing the binary information.

11. A binary data detection system for use with a source of alternating electrical signals representing binary information wherein the information portion is preceded by an initail burst of binary characters comprising means for deriving complementary alternating electrical signals representing binary data from said source; reference signal means responsive to said complementary alternating electrical signals, for producing complementary alternating reference signals having the same frequency as, and synchronized with, the portion of said complementary electrical signals effective thereon, comprising means for generating said complementary reference signals, variable frequency clock means having a periodic clock signal output thereof connected to and controlling said generating means, said clock means being adapted to adjust the clock signal output therefrom to synchronize with the input signal thereto, gating means connected to the input of said clock means, means responsive to said complementary electrical signals and adapted to supply a data-derived input signal to said gating means, and limiting means connected to the output of said clock for opening said gating means during only a limited portion of each period of said periodic output from said clock means; an initial burst detector connected to said source and responsive to said initial burst of binary characters by starting said clock means in synchronization with said data-derived signal, comprising an integrating network for detecting said initial burst, and timing means responsive to said integrating network for determining first and second synchronization periods, said initial burst detector being adapted to control said gating means during said first synchronization period so that all said data-derived signals are applied to said clock means, and to control said gating means during said second synchronization period so that said limiting means controls the portions of said data-derived signals applied to said clock means; and output means, including means for combining said complementary electrical signals and said complementary reference signals, for providing an output signal representing the binary information.

References Cited

UNITED STATES PATENTS 2,991,462 7/1961 Hose -------------- 340—347

DARYL W. COOK, *Acting Primary Examiner.*

MAYNARD R. WILBUR, *Examiner.*

J. H. WALLACE, A. L. NEWMAN, *Assistant Examiners.*